DEMODULATOR FOR DOUBLE SIDEBAND SUPPRESSED CARRIER SIGNALS

Filed March 1, 1968 3 Sheets-Sheet 1

INVENTOR
William J. Judge
By Smyth, Roston & Pavitt
ATTORNEYS

DEMODULATOR FOR DOUBLE SIDEBAND SUPPRESSED CARRIER SIGNALS

Filed March 1, 1968 3 Sheets-Sheet 2

INVENTOR
William J. Judge
By Smyth, Roston & Pavitt
ATTORNEYS

Oct. 27, 1970 W. J. JUDGE 3,537,017

DEMODULATOR FOR DOUBLE SIDEBAND SUPPRESSED CARRIER SIGNALS

Filed March 1, 1968 3 Sheets-Sheet 3

INVENTOR
William J. Judge
By Smyth, Roston & Pavitt
ATTORNEYS

United States Patent Office 3,537,017
Patented Oct. 27, 1970

3,537,017
DEMODULATOR FOR DOUBLE SIDEBAND SUPPRESSED CARRIER SIGNALS

William J. Judge, Garden Grove, Calif., assignor to The Magnavox Company, a corporation of Delaware
Filed Mar. 1, 1968, Ser. No. 709,541
Int. Cl. H03b 3/08
U.S. Cl. 329—122 6 Claims

ABSTRACT OF THE DISCLOSURE

An improvement for a Costas loop demodulator is disclosed wherein the bandpass filter, from which conventionally the FM subcarrier is taken, is substituted by a subcarrier phase tracking loop with its own VCO providing one input for the subcarrier discriminator within the Costas loop.

The present invention relates to a sideband lock demodulator for demodulating two base band signals which are superimposed upon a single carrier by means of orthogonal modulation.

A relatively recent development in communication engineering is the use of reduced threshold demodulators for analog frequency modulated signals such as audio or video signals. Such a modulator permits the enhancement of output signal-to-noise ratio to be realized in the usual manner for frequency modulation at values of input signal-to-noise ratios which are below the threshold of conventional limiter discriminator detector.

Two basic types of reduced threshold demodulators are known, the phase lock loop and the frequency feedback loop. Although the threshold improvements provided by either one of these demodulators are approximately equal, the relative ease of implementation makes a phase lock loop the preferred system. In addition to simplicity of implementation, the phase lock loop provides versatility which is not available in the frequency feedback demodulator. For example, beside the frequency tracking, the phase lock loop can be used as a synchronous amplitude detector, or it can be used as a precision phase tracking device. Such versatility of the phase lock loop makes it an ideal building block in a variety of novel signal processing devices.

It is an object of the present invention to suggest a device which is capable of utilization of both the amplitude detection and the phase tracking capabilities of the phase lock loop for efficient multiplexing of two analog signals.

In the new device, multiplexing of two independent base band signals is accomplished by respectively modulating the frequency of a carrier and, for example, of a subcarrier with two base band signals and by simultaneously superimposing the subcarrier as amplitude modulation on the carrier. In order to make best use of the transmitter power, the carrier is suppressed at the output of the modulator and, hence, the information corresponding to carrier frequency modulation is retained in the side bands only.

The fact that the carrier frequency modulation spectrum is transformed to the side band and does not appear as a carrier frequency suggests the designation of "virtual carrier multiplexing" (VCM) for the new technique. This designation shall be used throughout the following specification.

At the receiver side the missing carrier is re-inserted, and the deviation of its frequency is detected by a phase lock loop. Simultaneously the frequency modulation of the subcarrier is also recovered by a second phase lock loop. Despite the fact that the carrier and the subcarrier loops are interconnected to accomplish the recovery of the base band signals, there is very little interference between the two loops because of inherent orthogonality of the tracked signal.

Because a phase lock loop is a basic sub-unit of the novel VCM demodulator, the threshold performance of a VCM system is determined by the threshold behavior of the phase lock loop itself. There is a specific advantage that even though there is a mutual interconnection of the phase lock loops for carrier and sub-carrier frequencies, very little cross talk develops between the loops.

The basic elements of a two channel VCM demodulation system can be subdivided into three major sub-units: The carrier tracking loop, the subcarrier tracking loop and cross coupling circuitry. Except for differences in operating frequency the elements comprising the carrier and the subcarrier loops are similar. These elements are: an error detector, a low-pass filter and a voltage controlled oscillator. The cross coupling circuits consist of in-phase carrier and subcarrier detectors (multipliers) and 90° phase shifters.

The present invention can be regarded as an improved development of a so-called synchronous detector. However, the known synchronous detector has no provisions for the recovery of any subcarrier frequency modulation. In order to recover the subcarrier frequency modulation not only the provision of two phase lock loops is necessary, but it is important in what manner the two loops are interconnected. The interconnection of these tracking loops requires that the subcarrier signal is tracked synchronously, thereby the threshold of the subcarrier channel is enhanced. The principal rule for loop interconnection is to be seen in the requirement, that the signal input does not serve as reference signal source. Instead, the reference signals are derived from two voltage controlled oscillators, whereby either tracking loop benefits in that the effective noise bandwidth of the two VCOs is, in general, smaller than the bandwidth of a filter, if used to derive a reference signal from the signal proper. It is this interconnection of the loops that distinguishes the side band lock demodulator in accordance with the present invention from the conventional synchronous detector. Such interconnection reduces the noise in the carrier and the subcarrier tracking loops.

Since the recovery of the base band modulations is accomplished with relatively narrow bandwidth, the threshold gain resulting therefrom amounts in several db realized over conventional synchronous detectors.

While the specification concludes with claims particularly pointing out and distinctly claiming the subject mater which is regarded as the invention, it is believed that the invention, the objects and features of the invention, and further objects, features, and advantages thereof will be better understood from the following description taken in connection with the accompanying drawing, in which:

FIG. 1 illustrates somewhat schematically a block diagram of a transmission circuit network developing signals of the double side band suppressed carrier type which signals are to be demodulated with the network in accordance with the present invention;

FIGS. 1*a* and 1*b* illustrate frequency spectrum of carrier and subcarrier before and after modulation;

Figure 1:
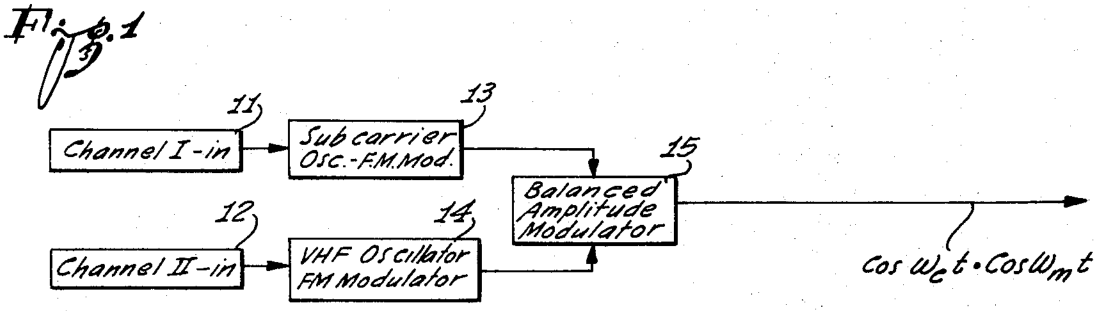

Proceeding now to the detailed description of the drawing, in FIG. 1 there is shown schematically a circuit network at a transmitter station for multiplexing two independently developed band signals. The two band signals are schematically denoted with channel I and channel II, respectively furnished by suitable devices 11 and 12. These two channels may, for example, be stereo audio signals.

Figure 1A:
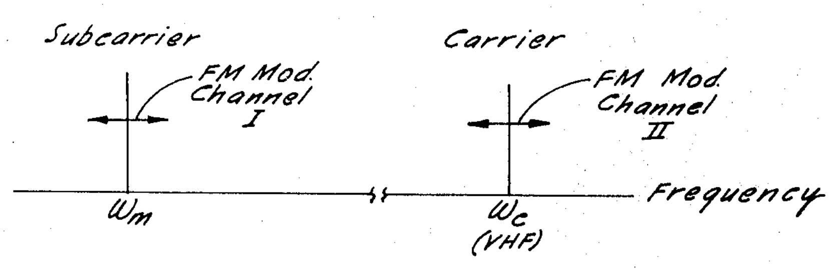

The signals of channel I as furnished by device 11 are fed to a subcarrier oscillator 13 for frequency modulation thereof. The channel II signals are fed to a very high frequency oscillator 14, and the channel II signals frequency modulate the carrier signal furnished by this oscillator 14 (see FIG. 1*a*). Next there is provided a balanced modulator 15 serving for amplitude modulating the very high frequency as carrier with the subcarrier oscillation.

Figure 1B:
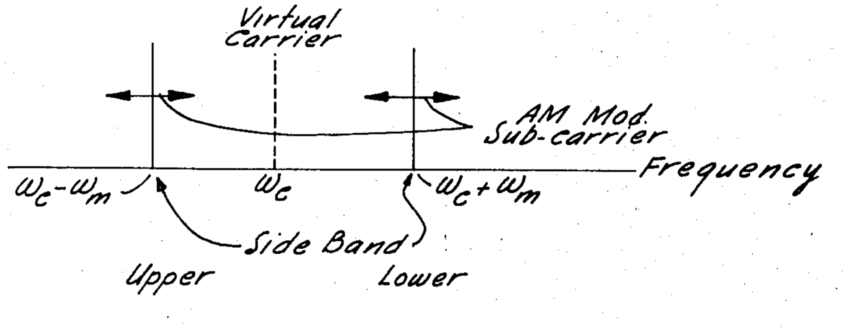

The output of the balanced amplitude modulator 15 is a carrier suppressed double sideband signal. The information corresponding to the carrier frequency modulation as well as the subcarrier frequency modulation is retained in the sidebands only (see FIG. 1*b*). The fact that the carrier frequency modulation spectrum is transferred to the sidebands and does not appear at the carrier frequency is the reason for the designation of this method as virtual carrier multiplexing VCM.

Let $\omega_c$ be the frequency of the carrier and $\omega_m$ be the frequency of the subcarrier, then the output of the balanced modulator 15 to be transmitted is a signal which is proportional to the $\cos \omega_c t \cdot \cos \omega_m t$.

Figure 2:
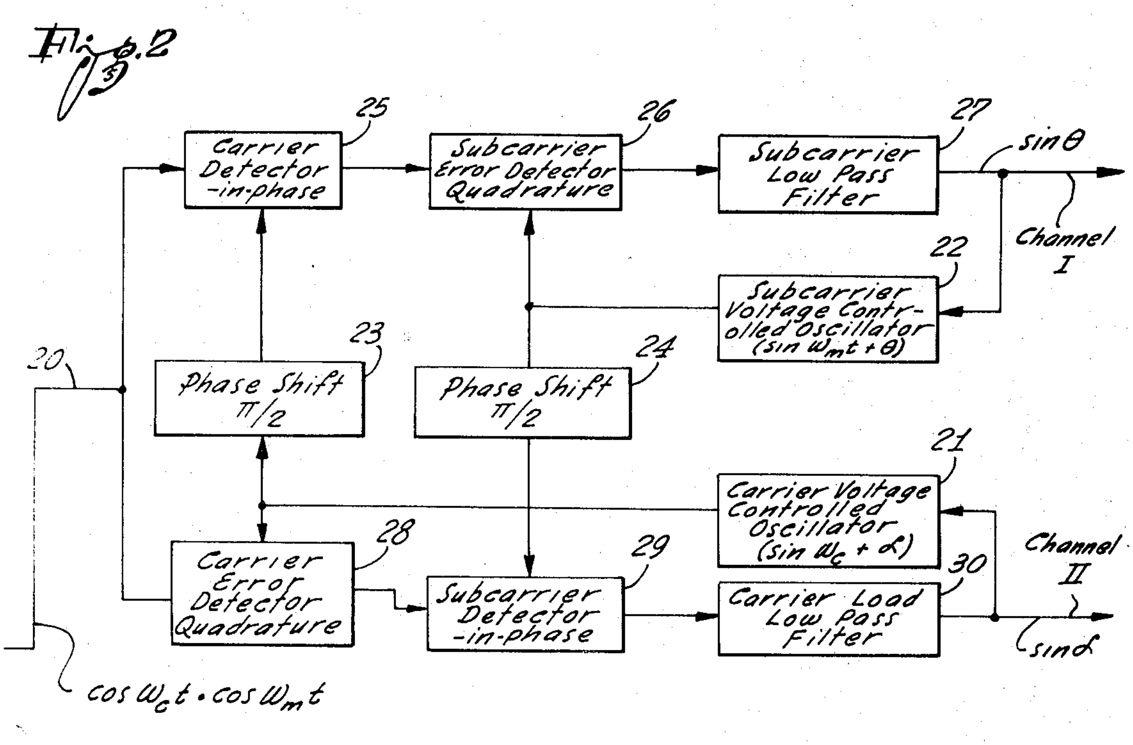
FIG. 2 illustrates somewhat schematically a block diagram of a side band lock demodulator in accordance with the preferred embodiment of the present invention.

Proceeding now to FIG. 2 there is shown an example for a circuit network in a receiver serving for recovering the FM base band modulation of both, subcarrier and carrier, i.e., for recovering the channel I and channel II signals which contain the information proper. Specifically, in this receiver circuit the suppressed carrier is reinserted, and the specific phase angle of carrier and subcarrier due to the frequency modulation of either by the base band signals is tracked by two phase lock loops.

Despite the fact that the carrier and the subcarrier loops are interconnected to accomplish the recovery of the base band signals of channel I and channel II, there is very little interference between the two because of the inherent orthogonality of the signals as they are being tracked by the circuit presently described.

Reference number 20 designates in general, the input terminal which may be connected to and be a component of an input circuit which includes an antenna, tuned circuits, an amplifier, etc. for receiving and developing an electrical signal that is proportional to:

$$\cos \omega_c t \cos \omega_m t \quad (1)$$

The principal elements of the sideband lock demodulator presently described are two voltage controlled oscillators 21 and 22; the first voltage controlled oscillator 21 develops a signal at carrier frequency, and it shall be assumed that this signal is proportional to $\sin(\omega_c t+\alpha)$. Herein phase angle $\alpha$ represents the carrier tracking error as compared with the particular incoming signal component at terminal 20 that is proportional to the carrier frequency. For purposes of simplifying the orientation it may be assumed at first that no FM modulation is present, in which case and during stationary and stable operating conditions, $\alpha$ will remain constant and small if the tracking is good.

Next, there is provided a subcarrier frequency voltage controlled oscillator 22 furnishing a signal which is proportional to $\sin(\omega_m t+\theta)$. Here phase angle $\theta$ represents the tracking error of the subcarrier voltage controlled oscillator as compared with the incoming signal at terminal 20. The simultaneous tracking of both carrier and subcarrier is now carried out and hereinafter described in accordance with the preferred embodiment of the invention.

There are provided two detectors 25 and 28 which are respectively a carrier detector and a carrier error detector operating as multiples or balanced mixers for respectively multipling the incoming signal in phase and in quadrature with the output of oscillator 21. The detector 28 is one of the elements of the subcarrier tracking loop, and detector 25 pertains to the cross coupling network of the two loops.

The output signal of voltage controlled oscillator 21 (VCO 21) is passed to a phase shifting device 23 shifting the signal as derived from the VCO 21 by exactly 90°. Accordingly, the output of the phase shifter 23 is proportional to $\cos(\omega t+\alpha)$. This phase shifter output signal is fed to one input terminal of the detector multiplier 25 receiving additionally the output signal of input device 20 and in accordance with Formula 1 given above.

Since the amplitude modulation of the carrier corresponds to the subcarrier signal, the latter is recovered with only negligible amplitude loss. The output of detector multiplier 25 therefore, is proportional to:

$$\cos \alpha \cdot \cos \omega_m t + \text{terms of frequency } 2\omega_c \quad (2)$$

The signals in accordance with Formula 2 are then passed on to one input of a subcarrier error detector 26. A low-pass filter removing frequencies of $2\omega_c$ may be interposed so that the subcarrier error detector receives only $\cos \alpha \cdot \cos \omega_m t$. Detector 26 has a second input to which is applied directly the output of subcarrier voltage control oscillator 22 (VCO 22). The detector 26 is a multiplier furnishing accordingly an output signal as set forth in the next formula:

$$\cos \alpha \cdot \sin \theta + \text{terms of higher frequencies} \quad (3)$$

It appears, therefore, that the subcarrier error detector 26 compares the phase of the detected subcarrier with the phase of the subcarrier voltage control oscillator 22.

However, the output of detector 26 also affected by the carrier tracking error $\alpha$, but as long as the tracking error $\alpha$ is small, the term $\cos \alpha$ will approximately be 1, which means that the carrier does not or hardly influences the subcarrier phase angle detection. In other words, the cross coupling from carrier to subcarrier detection is negligible as long as the carrier tracking error $\alpha$ remains small.

The output of subcarrier detector 26 is passed to a subcarrier loop low-pass filter 27 which removes terms of the frequency of about twice the subcarrier frequency $\omega_m$ and up. It was assumed that no modulation is present so that the output of the subcarrier loop filter 27 would then be a DC signal which is sent back to the subcarrier VCO for control thereof and which is proportional to $\sin \theta$.

In case of stable conditions and accurate tracking as well as a high gain in the tracking loop, the tracking error will be very small.

In case of subcarrier frequency modulation as was outlined with reference to FIG. 1 and representing the channel I input at the receiver, the signal developed at the loop point as defined by the output side of filter 27 represents the base band output for this channel I, and it appears as instantaneous tracking error of the subcarrier.

The tracking error will now be $\theta(t)$ in which the function of $\theta=\theta(t)$ is proportional to the modulation factor of the FM modulation of channel I at the transmitter side, and this function further includes the analog information defining the base band information of channel I.

The carrier is being tracked as follows: The signal at terminal 20 and output signal of VCO 21 are fed to the carrier error detector 28 as stated above, which detector multiples these two signals. As far as the carrier signal is concerned, this is a multiplication in quadrature, and the output signal furnished by this multiplier 28 is, therefore, proportional to the following expression:

$$\cos \omega_m t \sin \alpha + \text{terms of frequency } 2\omega_c \quad (4)$$

This output signal of the detector multiplier 28 as set forth in Formula 4 is then fed to another multiplier, called the subcarrier detector 29 multiplying in effect the subcarrier input signal component in phase with the signal furnished by phase shifter 24. There may be a low-pass filter interposed in connection between detectors 28 and 29 to particularly eliminate signal frequencies of at least $2\omega_m$ and up. A phase shifting device 24 connects the output of subcarrier VCO 22 to the second input of subcarrier detector 29 so as to apply thereto a reference signal which instantaneously in phase with the subcarrier input signal is in Formula 4 and as furnished by the detector 28 or by terminal 20. The output of subcarrier detector 29 is set forth in the following formula $$\cos \theta \sin \alpha + \text{terms of higher frequency} \qquad (5)$$

It shall be assumed again that the tracking error $\theta$ of the subcarrier loop is small, so that $\cos \theta$ is approximately 1. Accordingly, the output of the subcarrier detector 29 essentially depends on and varies with the rather small tracking error of the carrier loop. A carrier loop low-pass filter 30 removes all carrier and subcarrier frequencies, and feeds the filtered output as furnished by the detector 29 to the input side of the voltage control oscillator 21 which furnishes the carrier frequency for insertion thereof into the carrier recovery network.

Formulas 3 and 5 demonstrate to what extent and with what result the subcarrier and the carrier tracking loops are interrelated and cross-coupled. Specifically, these formulas indicate that there will be no, or practically no cross-coupling between the two loops, provided the tracking error phase angles of both loops are small so that the $\cos \theta \approx \cos \alpha \approx 1$. This holds true despite the fact that the carrier VCO signal recovers the subcarrier tracking error and the subcarrier VCO signal recovers the carrier tracking error. Furthermore, since the cross coupling is defined by a cosine function, the interdependence between the two tracking loops is not significant as long as the tracking errors are less than about .5 radian.

So far it was assumed that no frequency modulation was imposed upon the carrier. However the effects of the frequency modulation of both, the carrier and the subcarrier, has to be considered because the purpose of the invention is the detection of two independently transmitted base band signals defined above as being included in a channel I and a channel II.

As was already mentioned above, recovery of a subcarrier modulation as resulting in a tracking error $\theta(t)$ is possible with little interference for as long as $\cos \theta(t)=1$. The same holds true if $\alpha(t)$ with $\cos \alpha(t) \approx 1$. Thus, if either the carrier or the subcarrier, or both are frequency modulated, time dependent tracking errors will develop in the corresponding loops.

These variable tracking errors cause the following effects: (a) the probability of the respective loop losing track is increased, and (b) the cross coupling between the two loops is necessarily increased.

The undesirable effect of modulation tracking errors can be reduced by widening the bandwidth of both loops, provided that the input signal-to-noise ratio is high. However, when the input signal-to-noise ratio is low widening of the loop bandwidth causes an increase in noise level and the effect of this increase is similar to that produced by modulation errors. Thus, in a realistic case, i.e., when both modulation and noise errors are present in the loops, the effect of the loop cross coupling cannot be neglected completely because of its effect on the threshold performance of the demodulator. However, the threshold performance as a whole is still very favorable because of the following considerations.

This VCM demodulation as described thus far, tracks the frequency modulation of the carrier and also the frequency modulation of the subcarrier. The specific manner in which the two loops are interconnected is of critical importance. The subcarrier tracking loop is not simply connected to independently track the subcarrier signal, since such independent connection would not reduce the effective noise bandwidth of the subcarrier filter, and the carrier tracking loop would not benefit from subcarrier tracking. On the other hand if, as is done here, the output of the subcarrier VCO signals are introduced into the carrier loop, the carrier tracking loop benefits from such connection since the effect of noise bandwidth of the subcarrier VCO is smaller than the bandwidth of any subcarrier filter. It is this interconnection of the loops that distinguishes the sideband lock modulator according to the invention from the conventional synchronous detectors.

Each tracking loop uses as reference signals only signals derived from the two VCO's. This reduces the noise at the filter output side and therefore improves the threshold beyond any cross coupling due to independent carrier and subcarrier modulation. Furthermore the sequential multiplication in each loop of input signal derived from the VCO's eliminates the requirement of any band-pass filtering and only low-pass filters are instrumental in the ultimate elimination of carrier and subcarrier frequencies from the tracking error signal path in each loop.

If one assumes, for example, that the carrier itself is not frequency modulated, the single channel device then presented is still an improvement over the conventional synchronous detector for reason of an improved signal-to-noise ratio. From that standpoint one can see further that the modulation of the carrier by a second signal does not increase the power requirement of the transmitter, so that the information transmission of the second channel is obtained essentially free. This is true because the channel I as introduced is orthogonal modulation as compared with channel II since the subcarrier represents amplitude modulation of the carrier. The FM modulation of the suppressed carrier does not impair the overall system performance provided that both loops operate above threshold.

Figure 3:
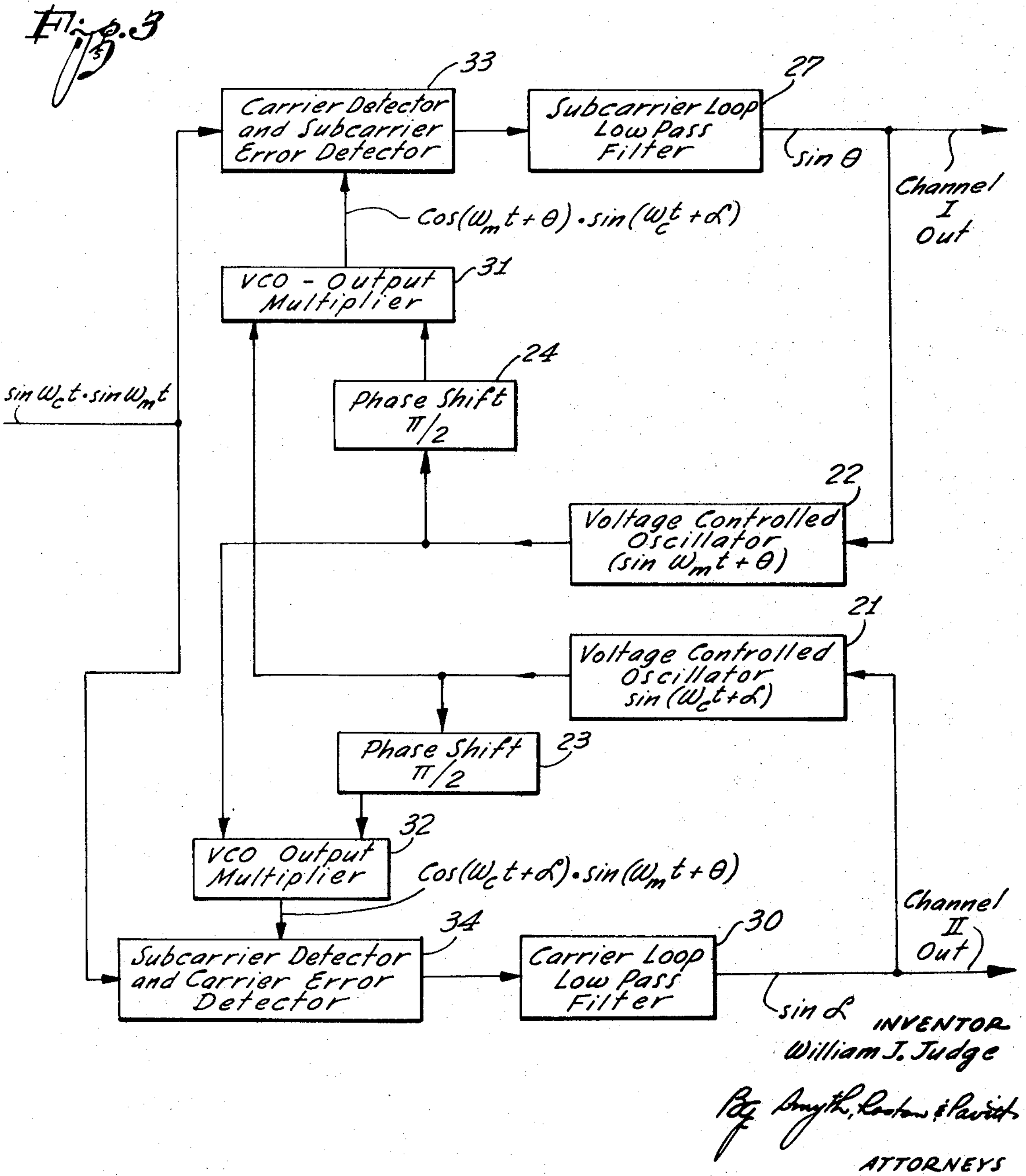
FIG. 3 illustrates somewhat schematically a block diagram of a modified side band lock demodulator as compared with FIG. 2.

From a different point of view one can see that the circuit network illustrated in FIG. 2 provides for in phase and quadrature multiplication for both subcarrier and carrier frequency signals by means of noise-free reference signals. In particular, the incoming signal is multiplied in phase with the output frequency of the carrier VCO and it is multiplied in quadrature with the output of the subcarrier VCO for subcarrier tracking. Conversely, the incoming signal is multiplied in quadrature with the output of the carrier frequency VCO, and it is multiplied in phase with the output of the subcarrier frequency VCO for carrier reinsertion and recovery of the carrier modulation. The sequence of multiplication is immaterial. FIG. 3 illustrates that the multiplication in-phase and in quadrature with regard to either frequency can be carried out in a different manner.

In FIG. 3 there are shown several circuit elements which correspond to those shown in FIG. 2. For example, there is the subcarrier VCO 22 and the carrier VCO 21, and there is the subcarrier loop low-pass filter 27 and the carrier loop low-pass filter 30. There is also provided a phase shifter 24 connected to the output of the VCO 22 and a phase shifter 23 which is connected to the output side of the VCO 21.

Different from FIG. 2 is the provision of two VCO output multipliers 31 and 32 providing two composite reference signals for each loop. The multiplier 32 has its two input terminals connected respectively to the output of VCO 21 and to the phase shifter 24, while the multiplier 32 has its two input terminals connected to the output terminal of VCO 22 and to phase shifter 23.

It should be mentioned that the provision of the phase shifters at the input side of these two multipliers is not essential, and they could be connected to the output side thereof. It is essential, however, that two reference signals are being developed as follows: The output of VCO multiplier 31 is $\cos (\omega_m t+\theta) \sin (\omega_c t+\alpha)$. The output of multiplier 32 is $\sin (\omega_m t+\theta) \cos (\omega_c t+\alpha)$. These output signals are respectively fed to multipliers 33 and 34. The multiplier 33 serves simultaneously as carrier signal detector and subcarrier error detector. Its specific function is to multiply the input signal received in phase as far as the subcarrier is concerned and in quadrature as far as the carrier is concerned. It shall also be assumed that the signal input is proportional to $\sin \omega_c t \sin \omega_m t$.

The output signal of the carrier detector and subcarrier error detector 33 is proportional to $$\cos \alpha \cdot \sin \theta + \text{terms of higher frequencies} \quad (6)$$

This signal is then passed on to the low-pass filter 27 developing at its output side a signal which substantially includes only $\cos \alpha \cdot \sin \theta$. Particularly, all signals having a frequency of twice the subcarrier frequency and higher are eliminated.

The subcarrier signal detector and carrier error detector 34 receives the input signal proper (Formula 6) and it receives as composite reference the output of the multiplier 32, so as to multiply in quadrature the subcarrier signal and in phase the carrier signal. The output of the detector 34 is then fed to the low-pass filter 30 which develops at the output side of a signal which is proportional to $\cos \theta \cdot \sin \alpha$ while removing frequency signals having twice the subcarrier frequency and higher frequencies.

In a manner corresponding to that outlined with reference to FIG. 2, the filter outputs of the filters 27 and 30 respectively feed the voltage controlled oscillators 22 and 21 for the same purpose, and the output signal as developed by these filters are the recovered channel I and channel II band signals.

Figures 4, 5:
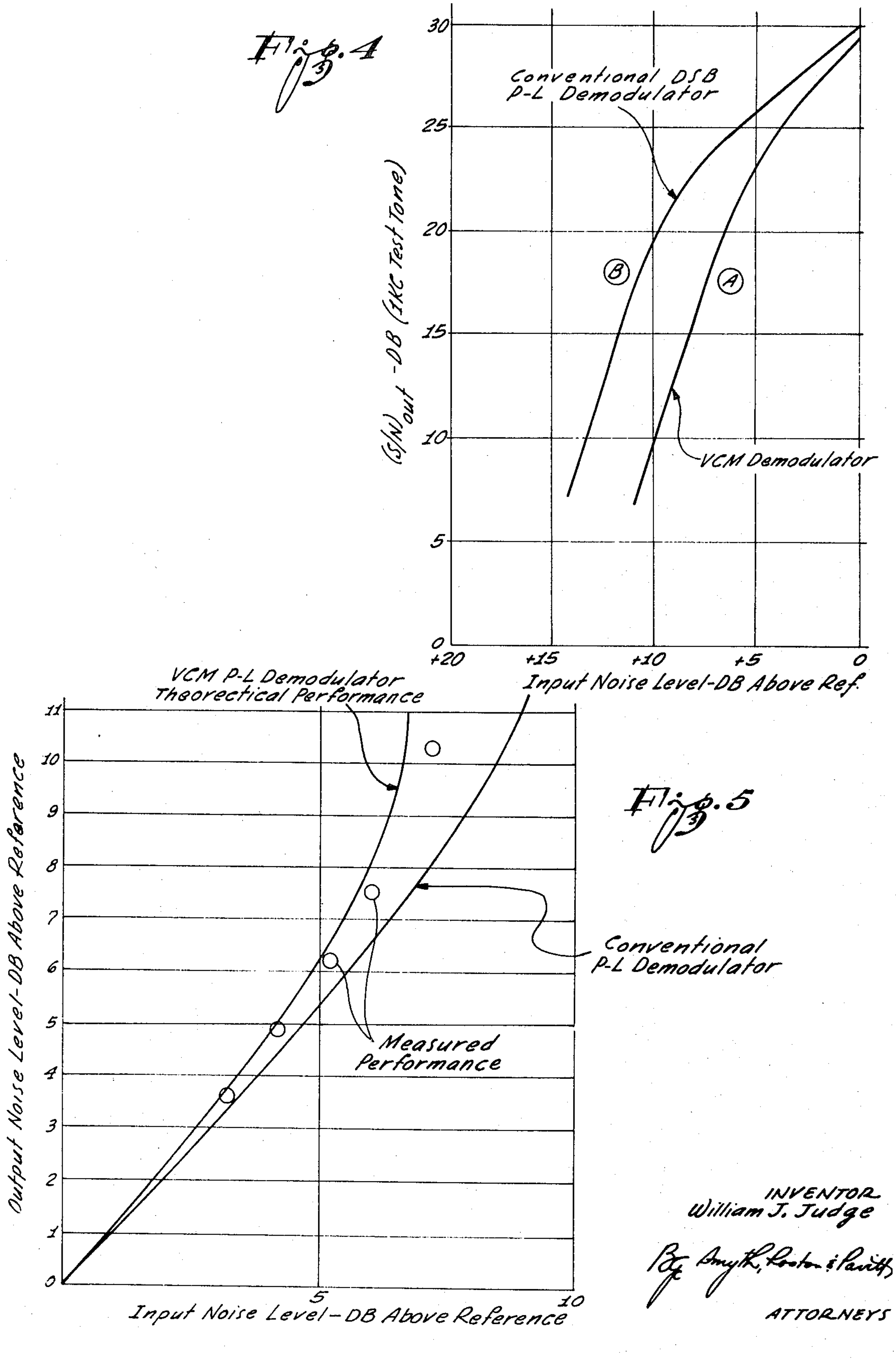
FIGS. 4 and 5 illustrate curves resulting from tests showing the behavior of a two channel VCM system of the type outlined with reference to FIGS. 2 and 3 in comparison with conventional phase locked demodulators.

FIG. 4 illustrates comparative results of the threshold performance of a VCM demodulator consisting of a two channel system set up in accordance with FIGS. 1 and 2 in comparison with a conventional phase lock demodulator. The test was conducted under the following conditions: As basic units there was employed a modulator multiplexer which included a subcarrier frequency modulating oscillator, a carrier frequency modulating oscillator, and a balanced modulator with sideband filter. The structure is basically similar to that outlined in FIG. 1. The receiver portion of this VCM device included a carrier tracking loop, a subcarrier tracking loop and two audio low-pass filters within the loops as was described with reference to FIG. 2.

Since the testing with base band noise modulation was found to be unfeasible for practical reasons, other base band signals were used to determine the performance of the VCM system. Specifically, the signals used for modulating the frequency of the subcarrier and of the carrier were (a) an audio test tone, and (b) a voice spectrum.

For audio test tone measurement the frequency of the subcarrier was deviated by $\pm 6$ kc. at a 1 kc. rate. Simultaneously thereto, the frequency of the carrier was deviated by the same amount but at a 900 c.p.s. rate.

The performance of the VCM modulator was obtained by measuring the output signal-to-noise ratio for the subcarrier channel at a fixed level of input signal and at various levels for the intermediate frequency noise. For this test the output signal-to-noise ratio was measured by means of a distortion meter.

The measurement itself was done in two steps. First, the level of signal plus noise in the audio band of 3 kc. was measured and recorded. The 3 kc. cut off was provided by the audio filters placed at the output of the demodulator. Next the signal was removed from the output by means of the distortion meter's notch filter, and the level of residual noise measured on the RMS voltmeter. Although this procedure did not yield the true signal-to-noise ratio, it permitted the measurement of the relative strength of the output noise without removal of the modulation signal.

Measurement of the output noise level with tone modulation removed does not yield the true reading because the effect of the tracking error is not included. Simultaneously, with the measurement of the output signal-to-noise ratio the relative increase in intermediate frequency noise was measured on a noise intensity meter. The distortion in reading the intermediate frequency noise level was avoided by tuning the band pass of the noise meter to the sideband free portion of the IF spectrum.

Measurement of the subcarrier channel output signal-to-noise ratio was performed under the following two conditions: First, the carrier loop was narrowed down to about 100 c.p.s. and carrier modulation was absent. This way the normal double sideband operation was simulated foregoing the advantages of the two channel VCM mode. The second condition was a carrier loop bandwidth set to about 4 kc. and a carrier deviated by $\pm 6$ kc. at the rate of 900 c.p.s. The second case corresponds to the true two channel VCM mode.

The results corresponding to these conditions are respectively depicted in FIG. 3 and by the curves A and B therein. These measuring curves have been found to correspond very close to theoretical predictions. Specifically, the near threshold behavior depicted by the experimental curves corresponds closely to the near threshold behavior represented by theoretical curves. Also, the below threshold behavior of the VCM, except for the roll off rates, resemble closely the behavior of the threshold loci of theoretical models.

The second test conducted involved simultaneous voice modulation of the subcarrier and the carrier channels. For this test the modulation index was adjusted for minimal tracking loss by applying audio information from tapes to the modulator inputs, and by observing the tracking errors on the oscilloscope. Furthermore, in this case the subjective threshold was determined by listening to the "pops" which usually accompany FM threshold, and estimating the particular input signal-to-noise ratio value at which the "pops" appeared at an average rate of 1 per second.

Using this technique, objective listeners have estimated about 1.5 db threshold differential between the VCM and the single loop audio threshold. It is important to note that the cross talk due to loop cross coupling was at all times below the level of the system noise.

In addition to audio tone and voice modulation tests, the performance of the VCM system was tested by measuring, in the absence of base band modulation, the relative increase in the output noise level vs. an equal increase in IF noise. The purpose of this test was to determine the effect of widening the carrier loop on the performance of the subcarrier channel. This test was performed for a carrier lop band of (a) approximately 100 c.p.s. and (b) carrier loop bandwidth of 4 kc.

The comparison between theoretical and experimental data for this test is shown in FIG. 5. Curves and data shown in FIG. 5 are significant in that they provide a direct comparison between the results of the experimental VCM evaluation and an analytical investigation based on a theoretical model set up for the device shown in FIG. 2.

The invention is not limited to the embodiments described above, but all changes and modifications thereof not constituting departures from the spirit and scope of the invention are intended to be included.

What is claimed is:

1. A sideband locked demodulator comprising:

signal means for receiving a double sideband suppressed carrier signal, and for providing an electrical composite signal representative thereof;

a first and a second voltage controlled oscillator each producing a signal respectively at carrier and subcarrier frequencies;

a first means for multiplying said composite signal in phase and in quadrature with the output furnished by said first oscillator;

a second means for multiplying said composite signal in phase and in quadrature with the output of said second oscillator;

third means including said first and said second means for providing a signal that is proportional to the sine of the phase deviation of the carrier oscillation as derived from said first oscillator and the corresponding oscillation within said composite signal, and for feeding said phase deviation signal to said first oscillator for tracking control thereof;

and fourth means including said first and said second means for providing a signal that is proportional to the sine of the phase deviation of the subcarrier oscillation as derived from said second oscillator and the corresponding oscillation with said composite signal, and for feeding said latter phase deviation signal to said second oscillator for tracking control thereof.

2. A sideband locked demodulator comprising:

signal means for receiving a double sideband suppressed carrier signal;

a first voltage controlled oscillator producing a signal having a subcarrier frequency;

a second voltage controlled oscillator producing a signal having the carrier frequency;

first means connected to said first and second oscillators for multiplying said received signal in phase with the carrier frequency as provided by said second voltage controlled oscillator and in quadrature with the subcarrier frequency as provided by said first voltage controlled oscillator;

first low-pass filter means connected to said first means to provide a signal representative of the subcarrier tracking error, and for feeding said subcarrier tracking error signal to said first oscillator, so as to close a subcarrier feedback tracking loop;

second means connected to said first and said second oscillators for multiplying said signal received in phase with the subcarrier frequency as provided by said first oscillator and in quadrature with the carrier frequency as provided by said second oscillator; and second low-pass filter means connected to said second means to provide a signal representative of the carrier tracking error and for feeding said carrier tracking error to said second oscillator to close a carrier feedback tacking loop.

3. A sideband lock demodulator comprising:

signal means for receiving a double sideband carrier-suppressed carrier signal and for providing a first output signal representative thereof;

a carrier voltage-controlled oscillator having particular phase;

a subcarrier voltage controlled oscillator having particular phase;

a carrier detection means and a subcarrier error detection means connected to said signal means and further connected to said carrier voltage controlled oscillator and to said subcarrier voltage controlled oscillator, the two detection means interconnected for providing a subcarrier phase error signal to said subcarrier voltage controlled oscillator to close a subcarrier phase error tacking loop;

a subcarrier detection means and a carrier error detection means connected to said signal means and further connected to said carrier voltage controlled oscillator and to said subcarrier voltage controlled oscillator the two detection means interconnected for providing a carrier phase error signal to said carrier voltage controlled oscillator to close a carrier phase error-tracking loop; and means for deriving demodulated signals from the inputs of the voltage controlled oscillators.

4. A sideband lock demodulator wherein a double sideband, suppressed carrier signal, the sideband being established by a subcarrier, is received by an in-phase multiplier and by a quadruture multiplier receiving also the output of a voltage controlled oscillator respectively directly and after a 90° phase shift, the voltage controlled oscillator receiving a carrier tracking error signal derived from the multipliers, there being means for carrier error tracking detection connected to the multipliers, the combination comprising:

the means for carrier error detection including a subcarrier detector connected directly to the quadrature multiplier to receive the complete output thereof;

a second voltage controlled oscillator having its output phase shifted by 90° and applied to the subcarrier detectors, the second voltage controlled oscillator providing subcarrier frequency oscillations; and an additional multiplier serving as subcarrier error detector receiving the output of said inphase multiplier and of said second voltage controlled oscillator, the additional multiplier providing the demodulated subcarrier output, and being connected so that the latter output controls said second voltage controlled oscillator for subcarrier phase tracking.

5. A demodulator as in claim 4, and including means for deriving a second demodulated output from the output of said subcarrier detector.

6. A sideband lock demodulator comprising:

signal means for receiving a double sideband subcarrier-suppressed carrier signal and for providing a first output signal representative thereof;

a carrier tracking loop including a voltage controlled carrier frequency oscillator, a carrier phase angle detecting means connected to said oscillator and further connected to said signal means and a first low-pass filter connected to said detecting means;

a subcarrier tracking loop included in said carrier tracking loop and including a second voltage controlled subcarrier frequency oscillator connected to said carrier phase angle detecting means, a subcarrier phase angle detecting means connected also to said second oscillator and to said signal means through said carrier tracking loop, and a second low-pass filter connected to said subcarrier phase angle detecting means; and means for deriving demodulated signals from the first and second filters.

References Cited

UNITED STATES PATENTS

| | | | |
|---|---|---|---|
| 3,174,104 | 3/1965 | Easter et al. | 325—419 X |
| 3,319,178 | 5/1967 | Broadhead | 331—25 X |
| 3,375,463 | 3/1968 | Madsen | 331—17 |
| 3,419,814 | 12/1968 | Graves et al. | 331—17 |

ALFRED L. BRODY, Primary Examiner

U.S. Cl. X.R.

179—15; 325—329, 419; 331—2, 11